US012384149B2

(12) United States Patent
Otsuka et al.

(10) Patent No.: US 12,384,149 B2
(45) Date of Patent: Aug. 12, 2025

(54) FLOW PATH MEMBER AND LIQUID DISCHARGE HEAD

(71) Applicant: CANON KABUSHIKI KAISHA, Tokyo (JP)

(72) Inventors: Manabu Otsuka, Kanagawa (JP); Ryotaro Murakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 17/932,229

(22) Filed: Sep. 14, 2022

(65) Prior Publication Data

US 2023/0088231 A1 Mar. 23, 2023

(30) Foreign Application Priority Data

Sep. 17, 2021 (JP) ................................ 2021-151987

(51) Int. Cl.
*B41J 2/14* (2006.01)
*B41J 2/16* (2006.01)

(52) U.S. Cl.
CPC ............. *B41J 2/14201* (2013.01); *B41J 2/16* (2013.01); *B41J 2/1607* (2013.01); *B41J 2/1623* (2013.01); *B41J 2/1628* (2013.01); *B41J 2/1629* (2013.01); *B41J 2/1631* (2013.01); *B41J 2/1634* (2013.01); *B41J 2/1645* (2013.01); *B41J 2002/14306* (2013.01)

(58) Field of Classification Search
CPC .... B41J 2/14201; B41J 2/1607; B41J 2/1623; B41J 2002/14306; B41J 2/1628; B41J 2/1629; B41J 2/1631; B41J 2/1634; B41J 2/1645; B41J 2/16
See application file for complete search history.

(56) References Cited

U.S. PATENT DOCUMENTS

2005/0100727 A1* 5/2005 Yokouchi .................. B32B 7/12 428/317.1
2022/0088928 A1* 3/2022 Tanaka ................. B41J 2/14233

FOREIGN PATENT DOCUMENTS

| | | | |
|---|---|---|---|
| JP | 2001-047620 | A | 2/2001 |
| JP | 2002234144 | A | 8/2002 |
| JP | 2006281715 | A | 10/2006 |
| JP | 2009096104 | A | 5/2009 |
| JP | 2015080265 | A | 4/2015 |

* cited by examiner

*Primary Examiner* — Yaovi M Ameh
(74) *Attorney, Agent, or Firm* — Canon U.S.A., Inc. IP Division

(57) ABSTRACT

A flow path member includes a first substrate, a second substrate, bonding adhesive, and recessed portions. The first substrate has a first surface formed with an opening of a flow path. The second substrate has a second surface facing the first surface. The bonding adhesive bonds the first and second surfaces together. The recessed portions are formed in at least one of the first surface of the first substrate and the second surface of the second substrate. Each recessed portion is a hole configured to take up excess bonding adhesive and, as a non-through hole, does not extend through the entire thickness of a substrate. Each of the recessed portions extends into the first substrate or the second substrate as a rectangular column or an elliptical column and, when a shape of each recessed portion is viewed from the direction orthogonal to the first surface, the shape is approximately isotropic.

16 Claims, 13 Drawing Sheets

FLOW PATH MEMBER AND LIQUID DISCHARGE HEAD

BACKGROUND

Field

The present disclosure relates to a flow path member and a liquid discharge head provided with the flow path member.

Description of the Related Art

In recent years, in manufacturing Micro Electro Mechanical Systems (MEMS) such as pressure sensors and acceleration sensors and functional devices such as microfluidic devices, devices configured by flow path members in which substrates are joined to each other using bonding adhesive have been manufactured. An example of the MEMS includes a liquid discharge head that discharges a liquid. In a case where the flow path member is applied to a liquid discharge head, the flow path member functions as a flow path member for supplying a liquid to a discharge opening for discharging the liquid.

An example of the liquid discharge head includes an inkjet recording head. The inkjet recording head has an energy generating element that provides energy for discharging ink.

A discharge opening member is formed on a substrate surface, and a plurality of discharge openings that discharges ink is formed in the discharge opening member. A through hole serving as a flow path of the ink is formed in the substrate, and the ink flows from one surface of the substrate toward the other surface through the through hole. The through hole and the discharge opening communicate with each other, and the ink having passed through the through hole is discharged from the discharge opening by a force applied from the energy generating element. Examples of the energy generating element include an element such as a heating element that boils ink by electrical heating, and an element such as a piezoelectric element that applies pressure to a liquid by utilizing a volume change.

As a flow path member used in such a liquid discharge head, Japanese Patent Application Laid-Open No. 2001-047620 discusses a flow path member formed by laminating a plurality of substrates having holes or grooves formed as flow paths. Each of the substrates is formed with recessed portions (relief grooves for bonding adhesive) for suppressing the bonding adhesive used for bonding the substrate from flowing into the holes or grooves serving as flow paths.

The relief grooves for the bonding adhesive discussed in Japanese Patent Application Laid-Open No. 2001-047620 are formed to have a directional orientation. Therefore, places occur where the strength of the substrate is low, in that directional orientation, and there are cases where the substrate or the flow path member are deformed, cracked, or damaged along the relief grooves due to handling or the like during the manufacturing process.

SUMMARY

The present disclosure is directed to providing a flow path member that is less likely to be deformed, cracked, or damaged, and to providing a liquid discharge head using the flow path member.

According to an aspect of the present disclosure, a flow path member includes a first substrate having a first surface formed with an opening of a flow path in the first surface, a second substrate having a second surface facing the first surface, bonding adhesive provided between the first surface and the second surface to bond the first substrate and the second substrate together to form the flow path member, and a plurality of recessed portions formed in at least one of the first surface of the first substrate and the second surface of the second substrate, wherein each of the plurality of recessed portions is a hole configured to take up excess bonding adhesive and, as a non-through hole, does not extend through the entire thickness of a substrate, and wherein each of the plurality of recessed portions extends into the first substrate or the second substrate as a rectangular column or an elliptical column and, when a shape of each recessed portion is viewed from the direction orthogonal to the first surface, the shape is approximately isotropic.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. The present disclosure exemplifies a case where two substrates are bonded together to form a flow path member. However, the present disclosure is not limited to this, and is also applicable to a case where a plurality of substrates is combined.

Figure 1:
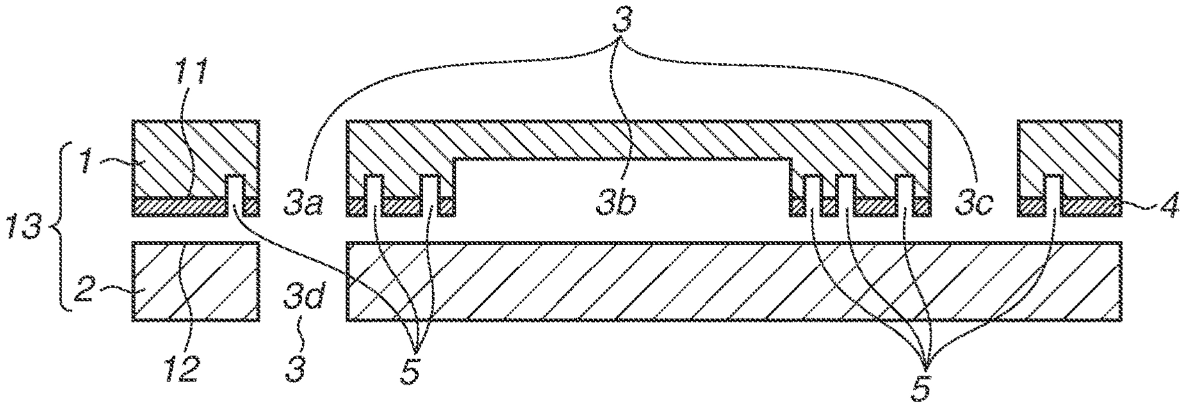
FIG. 1 is a cross-sectional view illustrating a flow path member.

FIG. 1 illustrates two substrates forming a flow path member according to a first exemplary embodiment. Openings 3*a*, 3*b*, and 3*c* are provided in a first surface 11 of a first substrate 1. The illustrated openings 3 include openings 3*a* and 3*c* penetrating the first substrate 1 in a thickness direction and include a non-penetrating opening 3*b* that does not penetrate through the first substrate 1. The openings 3*a* and 3*c* penetrating the first substrate 1 functions as flow paths through which ink flows.

A second surface 12 of a second substrate 2 illustrated in FIG. 1 is similarly provided with an opening 3*d*. The second surface 12 is a surface facing the first surface 11. The opening 3*d* formed in the second substrate 2 also functions as a flow path through which ink flows. Here, the illustrated openings 3*a* and 3*d* consistently penetrate the first substrate 1 and the second substrate 2 when the first and second substrates 1 and 2 are bonded. The illustrated opening 3*c* penetrates the first substrate 1 but does not correspond to an opening that penetrates the second substrate 2 when the first and second substrates 1 and 2 are bonded. The openings 3*a*-3*d* of the first substrate 1 and the second substrate 2 are not limited to those illustrated in the drawings and may be set to have any size and depth according to the application. A plurality of the openings 3 of the first substrate 1 and a plurality of the openings 3 of the second substrate 2 may be arranged in the substrates according to the application, and may be arranged and formed in any direction. For example, in a case of a liquid discharge head, penetrating openings from among the openings 3 are connected to a discharge opening for discharging a liquid such as ink. As a result, the openings may be used as a flow path through which a liquid such as ink flows or pressure chambers for applying, to a liquid, a volume change by an energy generating element such as a heater element or a piezoelectric element. Non-penetrating openings from among the openings 3, such as non-penetrating opening 3*b*, may be used as spaces for forming electric connection portions and energy generating elements such as heater elements and piezoelectric elements. Further, a plurality of the discharge openings is arranged in the substrates, and flow paths, electric connection portions, and energy generating elements may be arranged according to the number and positions of the discharge openings. The openings 3 may be freely formed in the first substrate 1 and the second substrate 2 accordingly.

Figure 2:
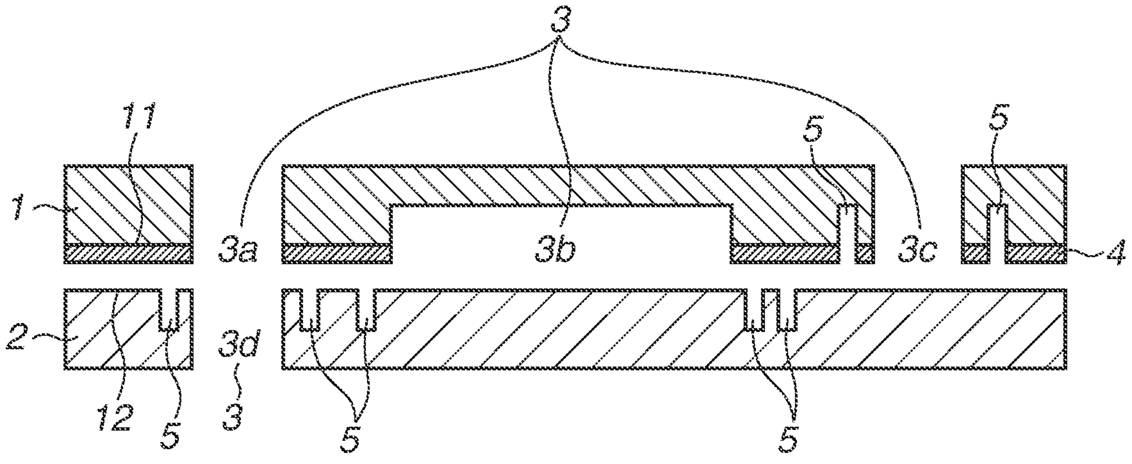
FIG. 2 is a cross-sectional view illustrating a flow path member.

Bonding adhesive 4 is provided on the first substrate 1, and the first substrate 1 and the second substrate 2 are bonded via the bonding adhesive 4. In other words, the first substrate 1 and the second substrate 2 are bonded together to form a flow path member 13, by the bonding adhesive 4 between the first surface 11 of the first substrate 1 and the second surface 12 of the second substrate 2. Furthermore, recessed portions 5 are formed in the vicinity of the openings 3 on the first surface 11 of the first substrate 1. The recessed portions 5 are formed on a surface applied with the bonding adhesive 4 in FIG. 1, but are not limited to this, and as illustrated in FIG. 2, may be formed on the substrate surface not applied with the bonding adhesive 4, or may be formed on both the surfaces when necessary. That is, the recessed portions 5 may be formed on at least one of the first surface 11 and the second surface 12. In a case where the first substrate 1 has the openings 3 and the second substrate 2 has the recessed portions 5, it is preferable that prearrangement or post arrangement of the recessed portions 5 in the second substrate 2 is such that, after bonding the first substrate 1 and the second substrate 2, the recessed portions 5 of the second substrate 2 are located in the vicinity of the openings 3 of the first substrate 1.

In the present exemplary embodiment, bonding of the first substrate 1 and the second substrate 2 has been described. However, the flow path member 13 according to the present disclosure may be formed of a plurality of substrates, and a flow path member formed of two or more substrates may also be formed by similarly bonding them via bonding adhesive 4.

Metals such as stainless steel and nickel, silicon substrates, ceramics such as alumina and zirconium, and glass may be suitably employed for the material of the first substrate 1 and the second substrate 2. A method of forming the openings 3 in the first and second substrates 1 and 2 is not particularly limited, and examples thereof include dry etching, wet etching, laser, and sandblasting, depending on the material.

A material having high adhesion to the substrate 1 or the substrate 2 is suitably employed for the bonding adhesive 4. A material having few air bubbles and the like, and high applicability is preferable, and a material having a low viscosity that makes it easy to reduce the thickness of the bonding adhesive 4 is preferable. The bonding adhesive 4 preferably includes a resin selected from a group consisting of an epoxy resin, an acrylic resin, a silicone resin, a benzocyclobutene resin, a polyamide resin, a polyimide resin, and a urethane resin. Examples of a method of curing the bonding adhesive 4 include a thermosetting method and a delayed ultraviolet curing method. Note that, in a case where any of the substrates is transparent to ultraviolet rays, an ultraviolet curing method may also be used to cure the bonding adhesive 4.

A known method such as a spin coating method, a slit coating method, a transfer method, and ink-jet or screen printing may be employed for the formation of the bonding adhesive 4 on the first substrate 1 and the second substrate 2. In a case where the openings 3 and the recessed portions 5 are already formed when the bonding adhesive 4 is formed, it is preferable to select a bonding adhesive forming method in which the bonding adhesive 4 does not easily enter the openings 4 and the recessed portions 5.

Bonding of the first substrate 1 and the second substrate 2 is carried out by bonding the substrates to each other via the bonding adhesive 4 and applying pressure. The bonding may be carried out in an atmospheric pressure environment, or may be carried out in a reduced pressure environment to suppress the mixing of air bubbles and the like. The bonding adhesive 4 may be heated to reduce the viscosity of the bonding adhesive 4 to flow more easily when necessary, and thus, it is also possible to suppress the mixing of air bubbles by bonding the first substrate 1 and the second substrate 2 while filling the voids.

Figure 3:
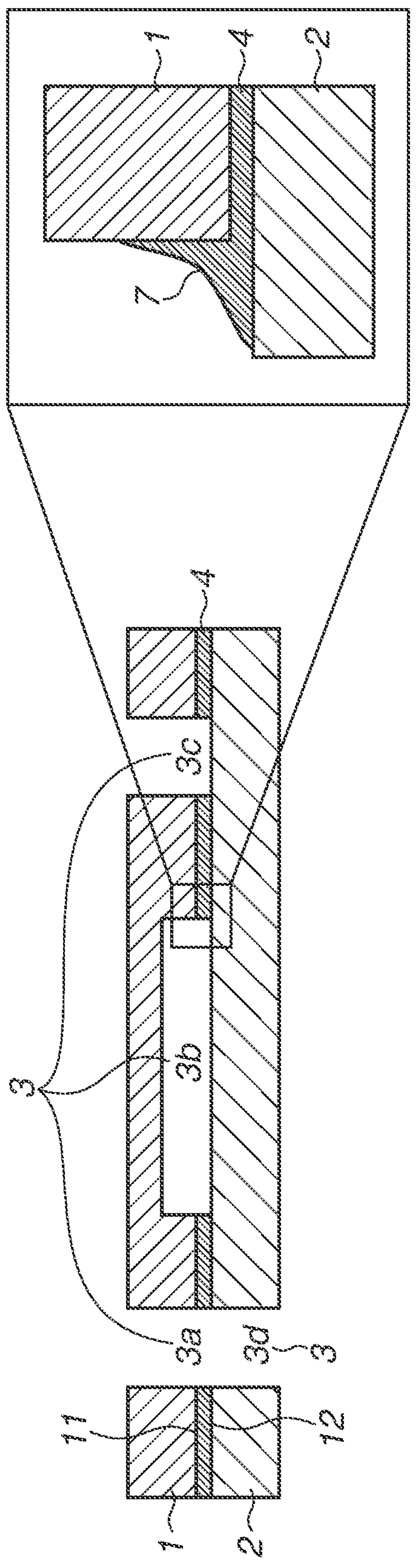
FIG. 3 is a cross-sectional view illustrating a first comparative example of a flow path member.

FIG. 3 is a diagram illustrating a first comparative example of the present disclosure. As illustrated in FIG. 3, in bonding the first substrate 1 and the second substrate 2, excess bonding adhesive 7 may squeeze out into the openings 3. For example, in an example of a liquid discharge head, in a case where the opening 3 is a flow path opening 3*a* through which a liquid such as ink flows, the flow path is narrowed or blocked, and thus, the flow of the liquid is impaired. Alternatively, in a case where an energy generating element, an electrode for electrical connection, or the like is provided in the opening 3*b*, the excess bonding adhesive 7 may come into contact with the energy generating element, the electrode, or the like, which may cause a deterioration in function or a trouble when the energy generating element, the electrode, or the like is electrically connected.

Figure 4:
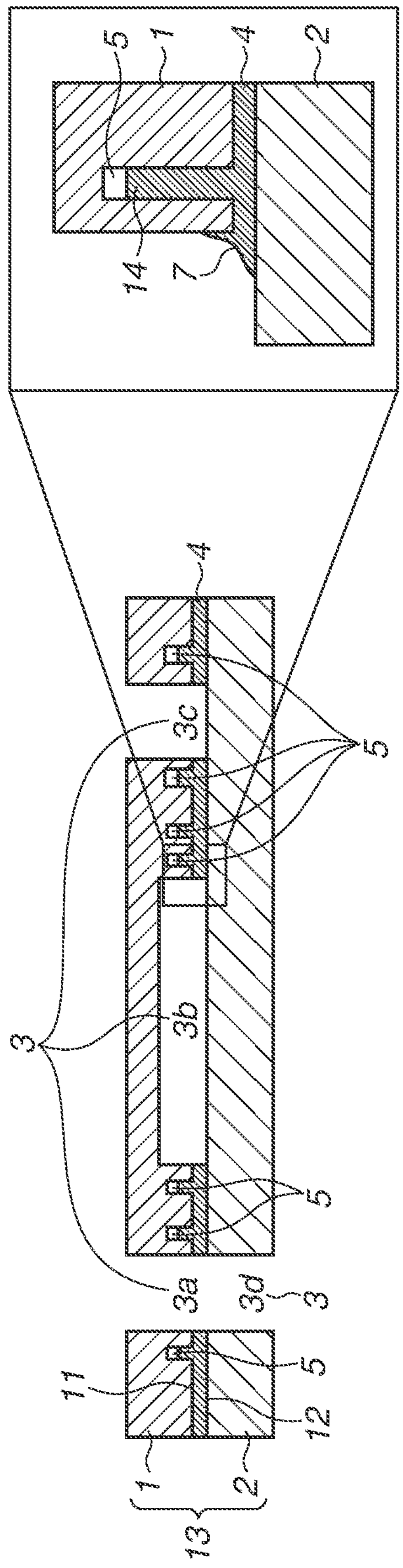
FIG. 4 is a cross-sectional view illustrating a flow path member.

FIG. 4 is a diagram illustrating the state where the first substrate 1 and the second substrate 2 illustrated in FIG. 1 are bonded. By providing the recessed portions 5 in the first substrate 1, excess bonding adhesive 14 from bonding adhesive 4 may move into the recessed portions 5 as illustrated in FIG. 4. As a result, it is possible to suppress squeeze-out of excess bonding adhesive 7 into the openings 3 by instead moving excessive bonding adhesive from bonding adhesive 4 into the recessed portions 5.

Figure 5:
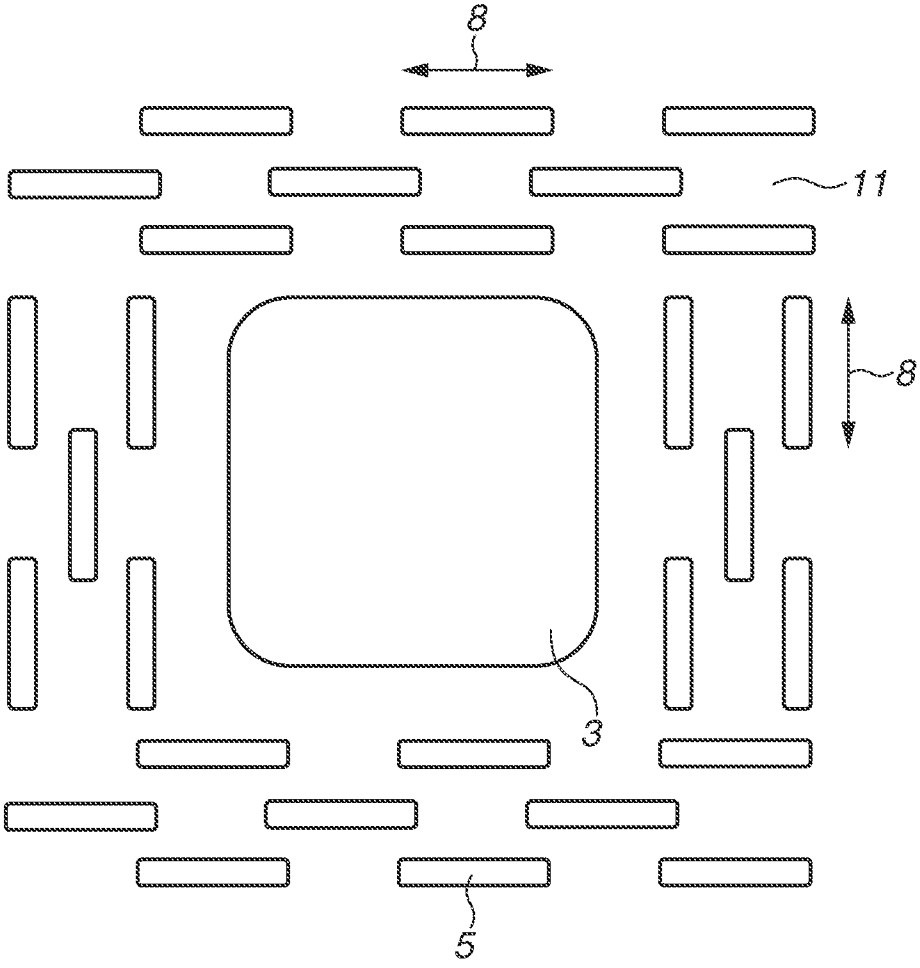
FIG. 5 is a plan view illustrating a second comparative example.
Figure 6:
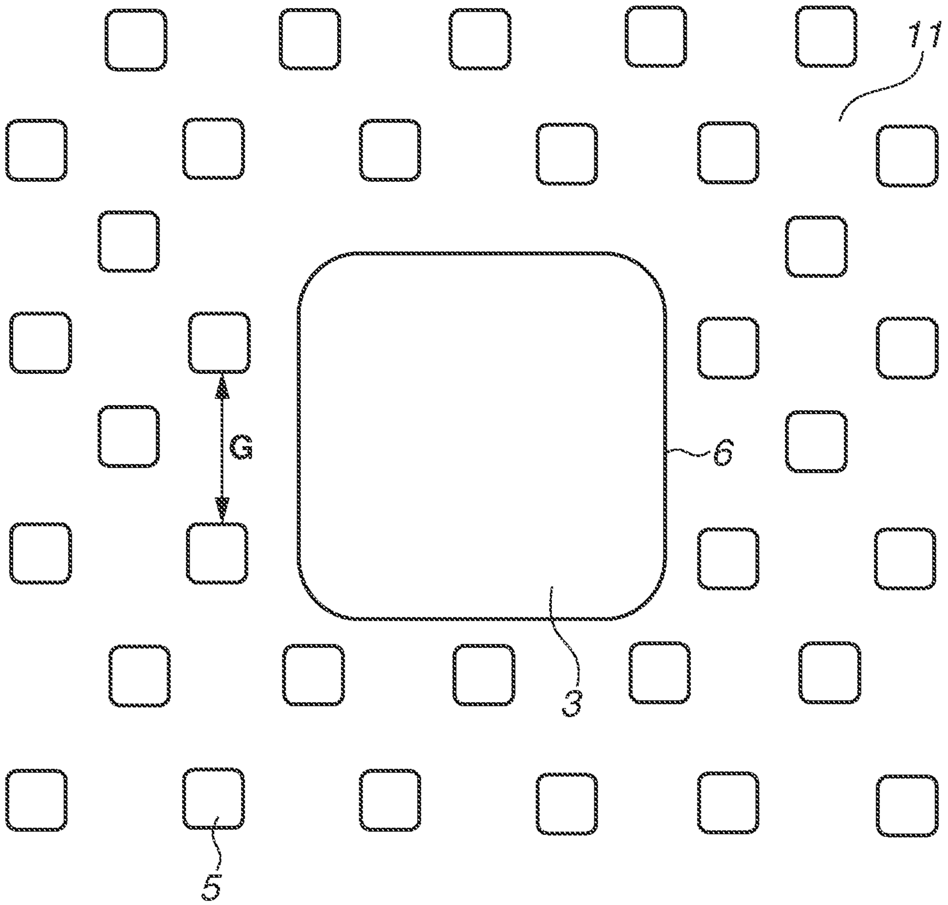
FIG. 6 is a top view of a first surface.

Next, the recessed portions 5 will be specifically described with reference to a plan view. FIG. 5 is a top view of the first surface 11, the opening 3*b*, and the recessed portions 5 when viewed from a direction orthogonal to the first surface 11, and illustrates a second comparative example. FIG. 6 is a top view of the first surface 11, the opening 3*b* having an outer edge 6, and the recessed portions 5 according to the present exemplary embodiment. With regard to a recessed portion 5 having a directional orientation, the directional orientation may be viewed as the recessed portion 5 being orientated in a way that meaningfully favors one direction over another or where one orientation direction of the shape predominates over any other orientation directions of the shape. As illustrated in FIG. 5, in a case where the recessed portions 5 formed in the first substrate 1 are formed to have a directional orientation 8, the planar shape of each of the recessed portions 5 is extremely biased in one direction. As a result, the strength of the first substrate 1 decreases along the directional orientation 8 of the recessed portions 5, and deformation, cracking (e.g., crack 10 FIG. 11A), or breakage of the first substrate 1 may occur along the directional orientation 8 of the recess portions 5 due to handling or the like during the manufacturing process.

Therefore, in the technique according to the present disclosure, as illustrated in FIG. 6, the recessed portions 5 are formed so that the planar shapes of the recessed portions 5 are approximately isotropic. Forming each recessed portion 5 with approximately equal physical properties along the planar axes works towards suppressing the generation of locations where the strength of the first substrate 1 and/or the second substrate 2 is lowered in a certain direction, and thus, it is possible to suppress the occurrence of deformation, cracks, and breakage of the substrate.

Figure 7A:
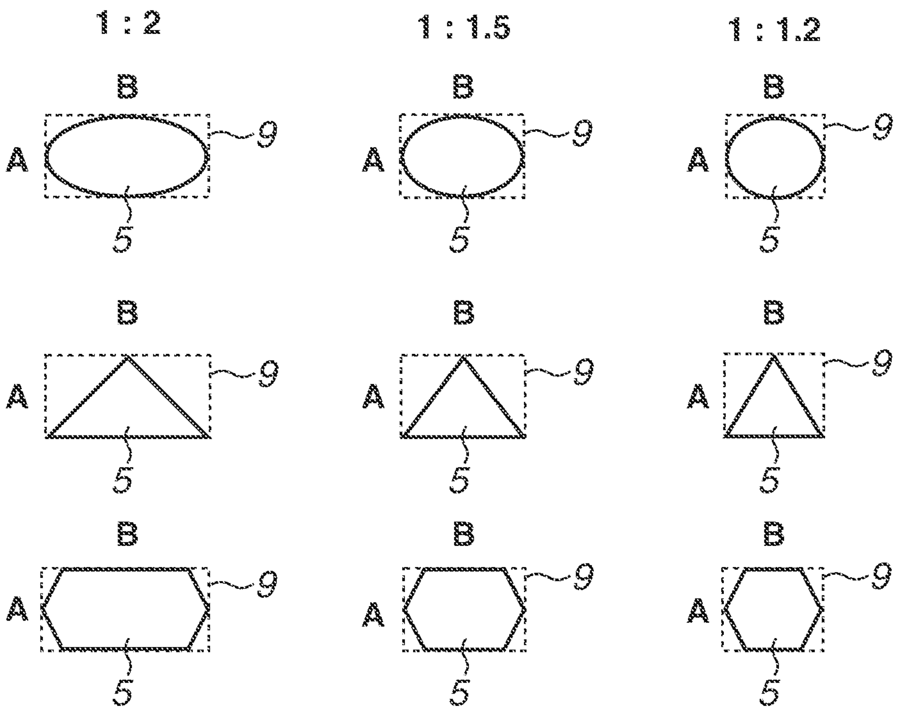
FIG. 7A and FIG. 7B are plan views of isotropic recessed portions.
Figure 7B:
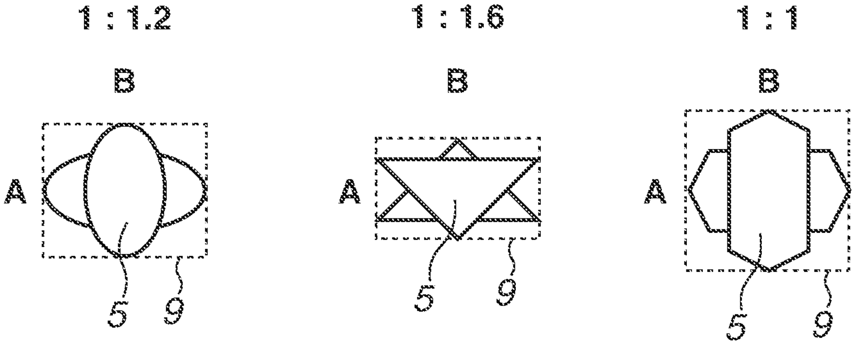

Each recessed portion 5 has a shape that may surround material, such as excessive bonding adhesive 14, or surround an absence of material and includes, as a quality, an external surface or outline of specific form or figure that represents the shape of the recessed portion 5. The shape of the recessed portions 5 in the present disclosure will be specifically described next. FIGS. 7A and 7B are schematic views illustrating plan views (top views) of individual recessed portions 5. The isotropic recessed portions 5 illustrated in FIGS. 7A and 7B having as little directional orientation as possible in the present disclosure is unlike the extremely biased planar shape of each of the recessed portions 5 illustrated in FIG. 5. Specifically, in the recessed portions 5 according to the present disclosure, it is preferable that, in each individual recessed portion as illustrated in FIG. 7A, the ratio between the short side A μm and the long side B μm be 1:1≤A:B≤1:2 when a smallest quadrangle 9 in contact with a planar shape (outer edge) of each of the recessed portions 5 is drawn. The ratio is more preferably 1:1≤A:B≤1:1.5, and even more preferably 1:1≤A:B≤1:1.3. Therefore, "approximately isotropic" in the present disclosure means that the ratio between the short side A μm and the long side B μm is 1:1≤A:B≤1:2.

On the other hand, to suppress the inflow of the bonding adhesive 4 into the opening 3*b*, it is preferable to form the plurality of recessed portions 5 to surround the outer edge 6 (FIG. 6) of the opening 3*b* when viewed from the top as illustrated in FIG. 6. However, even when the recessed portions 5 are formed to surround the outer edge 6 of the opening 3*b*, when the gap G (FIG. 6) between adjacent recessed portions 5 is large in a direction along the outer edge 6 (hereinafter referred to as the outer edge direction), the bonding adhesive 4 may pass through the gap G and enter the opening 3*b*. Therefore, the gap G between the recessed portions in the outer edge direction should be small enough by a predetermined amount that results in any excessive bonding adhesive 4 not passing through the gap G and instead passing into a recessed portion 5. A method of forming the recessed portions 5 at high density may be employed to reduce the gap G between the recessed portions. However, this may increase the number of recessed portions 5 to be formed, which may reduce the strength of the first substrate 1. Therefore, it is preferable to increase the ratio of A:B of the recessed portions 5 and to form the plurality of recessed portions 5 so that the long side B (FIGS. 7A and 7B) is oriented along the outer edge 6 of the opening 3*b*. As a result, when the outer edge 6 of the opening 3*b* is surrounded by the recessed portions 5, it is possible to reduce the number of recessed portions 5 required to reduce the gap G between adjacent recessed portions in the outer edge direction, and to suppress the inflow of the bonding adhesive 4 into the opening 3*b* while suppressing a decrease in the strength of the first substrate 1. That is, the ratio of recessed portions 5 in the present disclosure is preferably 1:1≤A:B. For example, in a case of a circular shape, an ellipse can be suitably employed.

FIG. 7B illustrates an example in which two recessed portions are overlapped. As illustrated in FIG. 7B, even when each of the recessed portions 5 in the first and second substrates 1 and 2 according to the present exemplary embodiment has a shape in which a plurality of recessed portions is rotated and overlapped between so that centers of the plurality of recessed portions in the first and second substrates 1 and 2 coincide with each other, it is possible to apply a smallest circumscribed quadrangle 9 as long as it is within the above-described range when drawn. At this time, it is preferable to employ a planar shape for each of the recessed portions (as illustrated in FIG. 7A) in the first substrate 1 to be overlapped with a recessed portion 5 in the second substrate 2 that is included in the scope of the present disclosure.

In a case where the planar shape of the recessed portions is a polygon, it is preferable that the recessed portions be formed with a curvature because an apex of the polygon causes stress concentration. Specifically, a radius of curvature of the apex is preferably ¼ or more, and more preferably ⅓ or more of the length of the short side A μm of the smallest circumscribed quadrangle 9. Further, the planar shape is more preferably a circle or an ellipse satisfying the scope of the present disclosure than a polygon.

The recessed portions 5 can be manufactured by using a general mask to give controllability to the shape, although it depends on the material of the substrate and the method of manufacturing the recessed portions 5. The recessed portions 5 are preferably patterned with a photoresist or the like according to the size of the recessed portions 5 and a need for processing accuracy, and then processed by dry etching or the like. The recessed portions 5 are preferably formed at the same time as the formation of the opening 3 of the first substrate 1 or the second substrate 2, but may be formed separately from the opening 3, and is not particularly limited.

Figure 8:
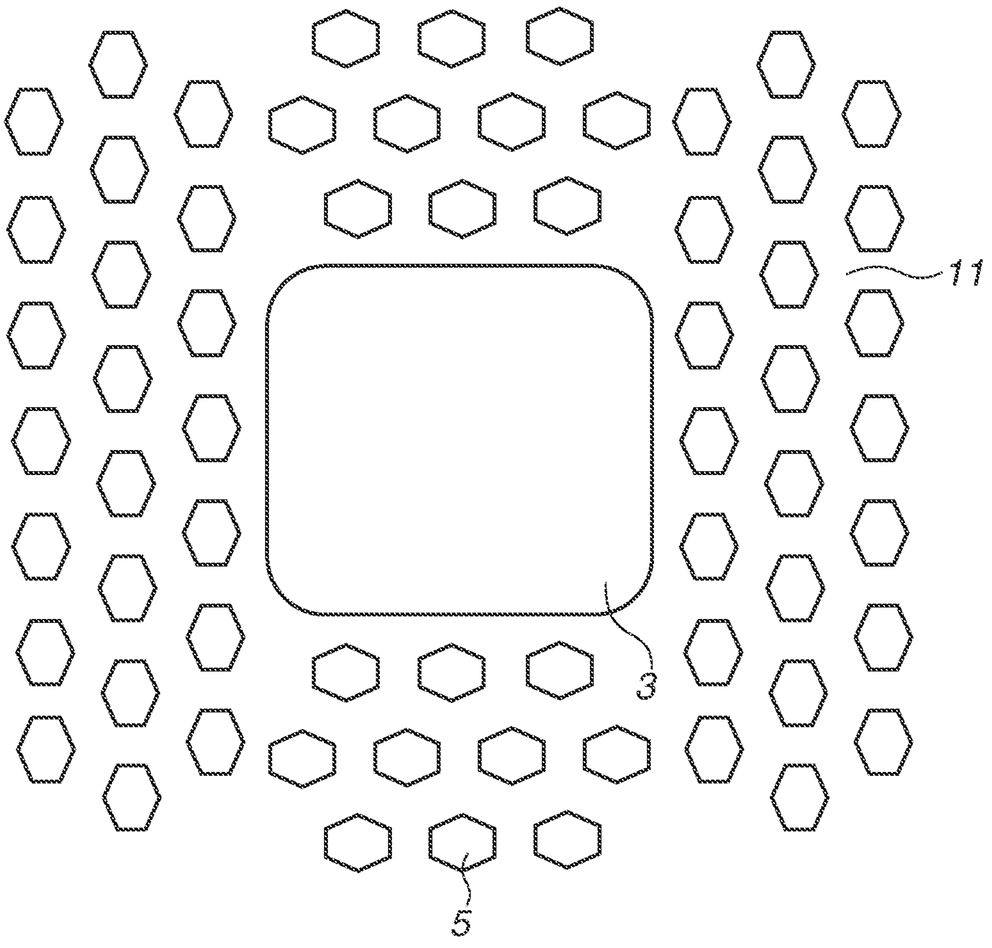
FIG. 8 is a top view of a first surface according to a second exemplary embodiment.

Next, a second exemplary embodiment will be described. FIG. 8 is a top view of the first surface 11, the opening 3*b*, and the recessed portions 5 according to the present exemplary embodiment. In FIG. 8, the recessed portions 5 are regularly arranged (arrangement intervals between the recessed portions 5 are all the same). The arrangement interval of the recessed portions 5 depends on the thickness and the material of the first substrate 1 and the depth of the recessed portions 5, but even when the directional orientation of the recessed portions 5 is eliminated, there is a concern that the rigidity may decrease due to concentration. If the recessed portions 5 are arranged apart from each other, the number of paths through which the bonding adhesive 4 flows into the opening 3*b* increases, and thus, there is a concern that the bonding adhesive 4 may squeeze out into the opening 3*b*. Therefore, a separate portion preferably has at least 1 to 100 μm or more. The recessed portions 5 may have a hexagonal honeycomb structure to further maintain strength of the first substrate 1.

Figure 9:
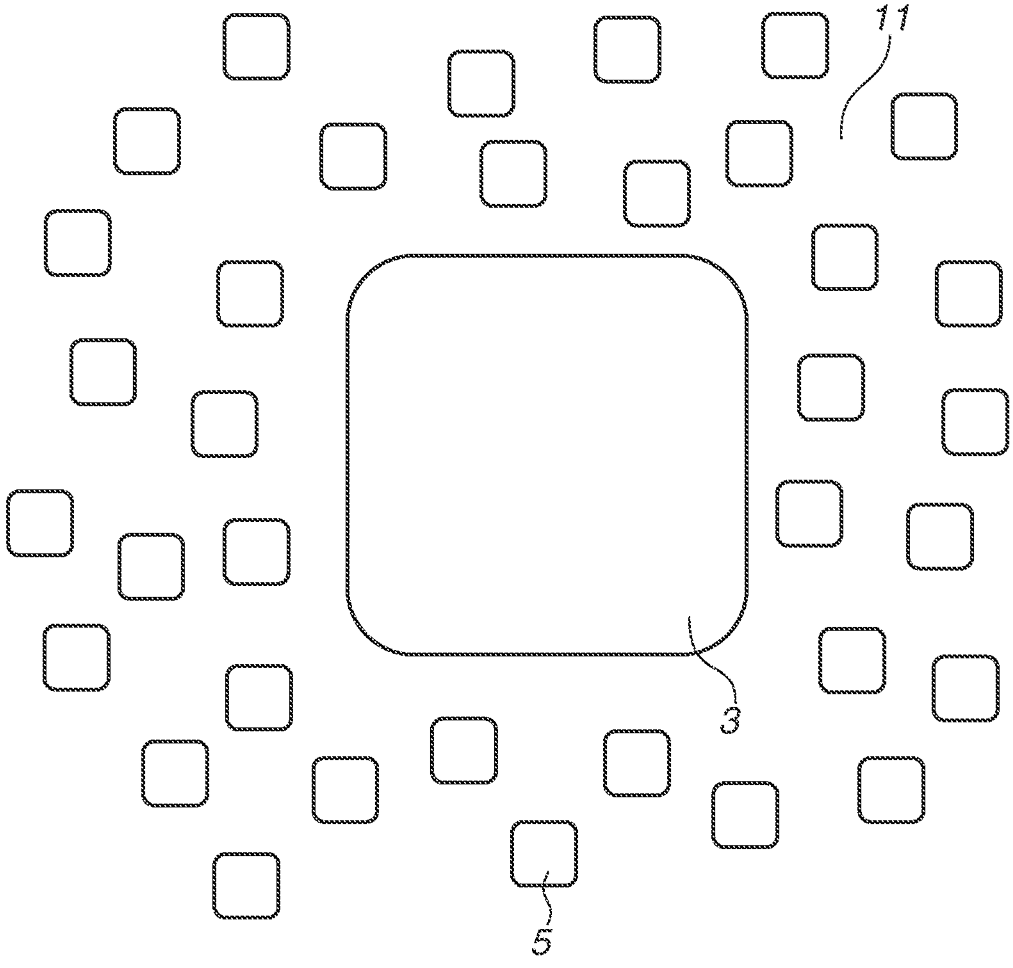
FIG. 9 is a top view of a first surface according to the second exemplary embodiment.
Figure 10:
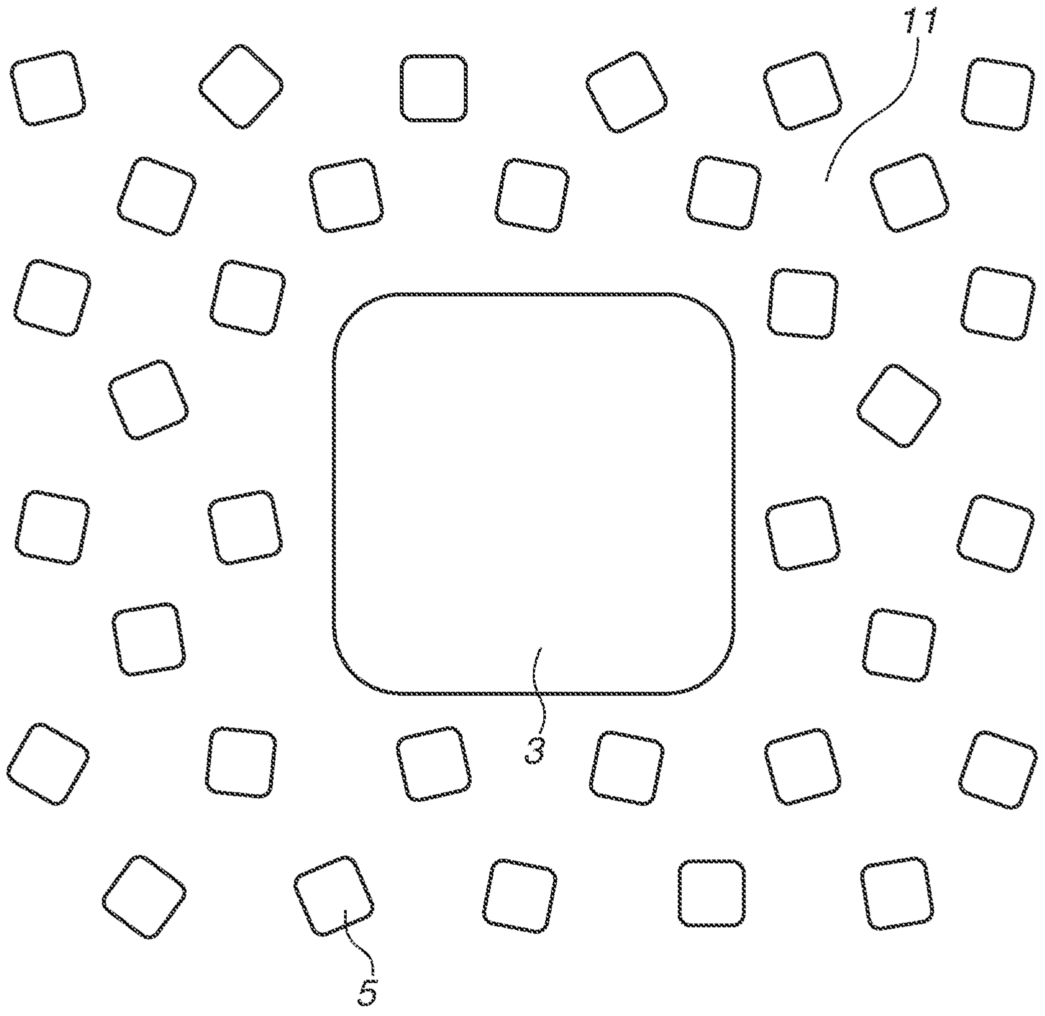
FIG. 10 is a top view of a first surface according to the second exemplary embodiment.
Figure 11A:
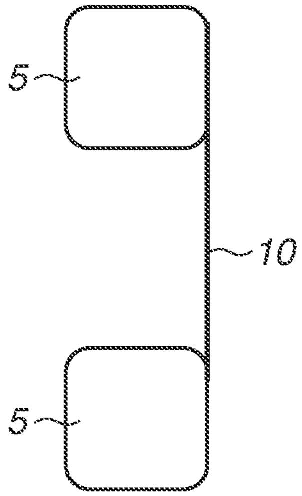
FIGS. 11A to 11C are top views illustrating minute cracks generated in a recessed portion.
Figure 11B:
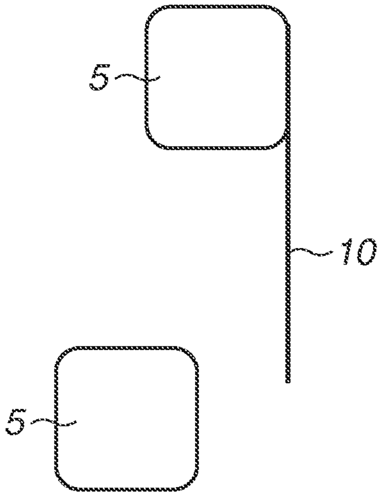
Figure 11C:
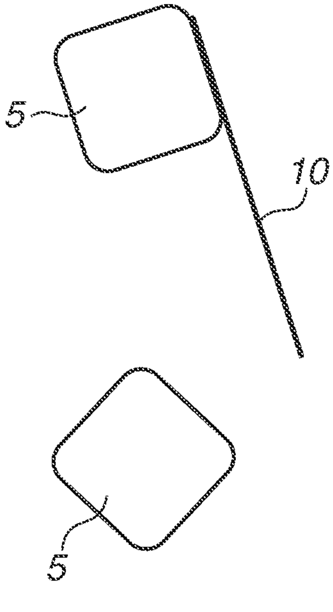

FIG. 9 is a diagram illustrating an example in which the recessed portions 5 are irregularly arranged so that the arrangement intervals between the adjacent recessed portions 5 differ depending on the location. In this case, it is more preferable to displace the recessed portions 5 so that the extension lines of a side of an adjacent recessed portion 5 do not completely overlap each other. The recessed portions 5 may be each rotated as illustrated in FIG. 10 and be arranged so that the respective orientations are different from each other. In other words, each recessed portion 5 is formed to be tilted with respect to other recessed portions adjacent to the recessed portion 5. For example, as illustrated in FIGS. 11A to 11C, in a case where a minute crack 10 is generated along sides of the recessed portions 5, cracks may be connected on the same side as illustrated in FIG. 11A. However, if positions of adjacent recessed portions 5 are shifted as illustrated in FIG. 11B and if the adjacent recessed portions 5 are rotated as illustrated in FIG. 11C, it is possible to make it difficult for the cracks to be connected to each other. These suppress the cracks from being connected to each other in a chained manner and from being larger, suppress a decrease in rigidity, and suppress the occurrence of breakage or cracking of the substrate.

Figure 12:
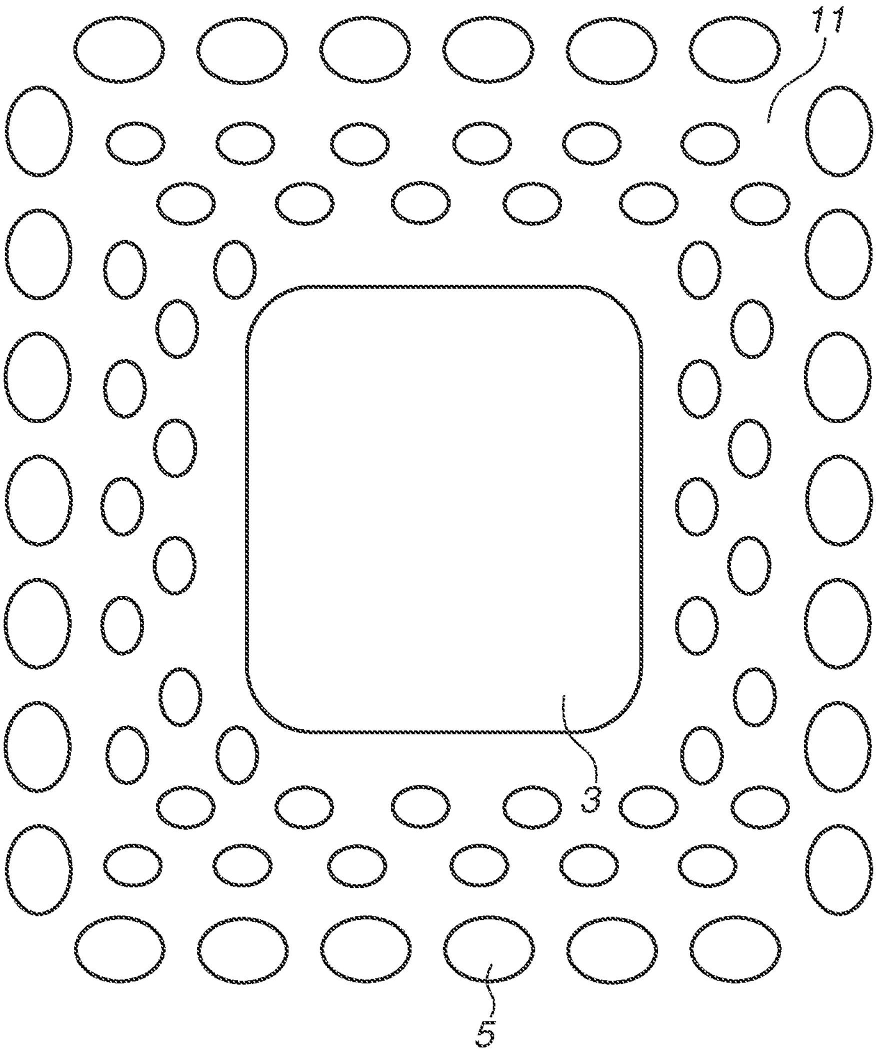
FIG. 12 is a top view of a first surface according to the second exemplary embodiment.
Figure 13:
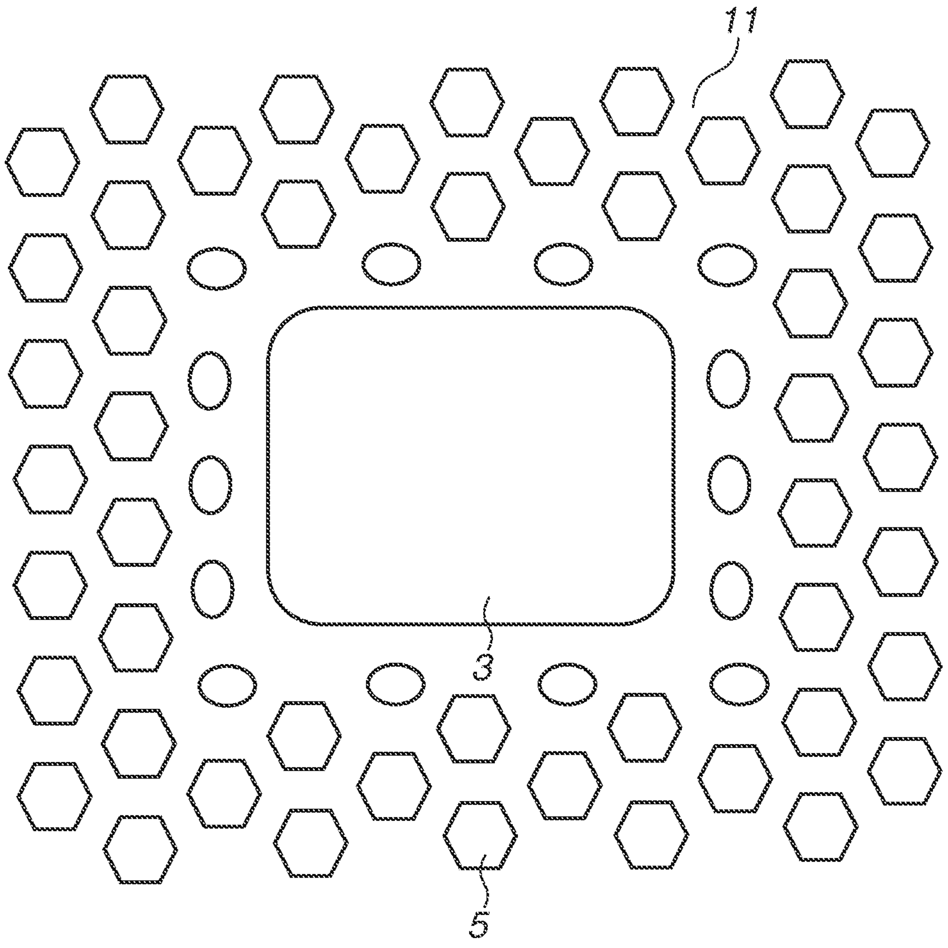
FIG. 13 is a top view of a first surface according to the second exemplary embodiment.

FIG. 12 and FIG. 13 are diagrams illustrating modifications of the present exemplary embodiment. As illustrate in FIG. 12, the recessed portions 5 having different sizes may be arranged as needed. As illustrated in FIG. 13, the recessed portions 5 having shapes different from each other may be arranged. For example, if the recessed portions 5 near the opening 3*b* are reduced in size, densely arranged, or changed in shape, it is possible to suppress a decrease in rigidity and prevent breakage and cracking.

Exemplary embodiments of the recessed portions 5 according to the present disclosure have been described; however, the present exemplary embodiments are not limited to the contents illustrated in the drawings, and each of the exemplary embodiments may be combined as necessary.

According to the present disclosure, it is possible to provide a flow path member 13 that is less likely to be deformed, cracked, or damaged, and a liquid discharge head using the flow path member 13.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-151987, filed Sep. 17, 2021, which is hereby incorporated by reference herein in its entirety.

What is claimed is:

1. A flow path member comprising:

a first substrate having a first surface formed with an opening of a flow path in the first surface;

a second substrate having a second surface facing the first surface;

bonding adhesive provided between the first surface and the second surface to bond the first substrate and the second substrate together to form the flow path member; and a plurality of recessed portions formed in at least one of the first surface of the first substrate and the second surface of the second substrate, wherein each of the plurality of recessed portions is a hole configured to take up excess bonding adhesive and, as a non-through hole, does not extend through the entire thickness of a substrate, and wherein each of the plurality of recessed portions extends into the first substrate or the second substrate as a rectangular column or an elliptical column and, when a shape of each recessed portion is viewed from the direction orthogonal to the first surface, the shape is approximately isotropic, and wherein, when the shape of each recessed portion is viewed from the direction orthogonal to the first surface, a ratio between a short side A of the shape and a long side B of the shape is $1:1 \leq A:B \leq 1:2$, where A denotes a short side of a smallest quadrangle in contact with an outer edge of each recessed portion and B denotes a long side of the smallest quadrangle in contact with the outer edge of each of the plurality of recessed portions.

2. The flow path member according to claim 1, wherein the ratio between the short side A and the long side B is $1:1 \leq A:B \leq 1:1.5$.

3. The flow path member according to claim 1, wherein the ratio between the short side A and the long side B is $1:1 \leq A:B \leq 1:1.3$.

4. The flow path member according to claim 1, wherein the plurality of recessed portions is formed so that the long side B is oriented along an outer edge of the opening.

5. The flow path member according to claim 1, wherein, when the shape of each recessed portion is viewed from the direction orthogonal to the first surface, the shape is a polygon, and a radius of curvature of an apex of the polygon is ¼ or more of a length of the short side A.

6. The flow path member according to claim 5, wherein the radius of curvature of the apex of the polygon is ⅓ or more of the length of the short side A.

7. The flow path member according to claim 1, wherein, when the shape of each recessed portion in the first substrate and in the second substrate is viewed from the direction orthogonal to the first surface, the shape of recessed portions in the second substrate is rotated and overlapped relative to a shape of recessed portions in the first substrate.

8. The flow path member according to claim 1, wherein arrangement intervals between the plurality of recessed portions are each at least 1 to 100 micrometers (μm) or more.

9. The flow path member according to claim 1, wherein arrangement intervals between the plurality of recessed portions are all the same.

10. The flow path member according to claim 1, wherein arrangement intervals between the plurality of recessed portions vary depending on location of the recessed portion.

11. The flow path member according to claim 1, wherein, when the shape of each recessed portion is viewed from the direction orthogonal to the first surface, an extension line of a side of each of the plurality of recessed portions does not overlap with a side of any other recessed portions adjacent to the recessed portion.

12. The flow path member according to claim 11, wherein, when the shape of each recessed portion is viewed from the direction orthogonal to the first surface, each target recessed portion of the plurality of recessed portion is formed to be tilted with respect to other recessed portions adjacent to the target recessed portion.

13. The flow path member according to claim 1, wherein, when the shape of each recessed portion is viewed from the direction orthogonal to the first surface, the plurality of recessed portions includes recessed portions having different shapes.

14. The flow path member according to claim 1, wherein, when the shape of each recessed portion is viewed from the direction orthogonal to the first surface, the shape is a hexagon.

15. A flow path member comprising:

a first substrate having a first surface formed with an opening of a flow path in the first surface;

a second substrate having a second surface facing the first surface;

bonding adhesive provided between the first surface and the second surface to bond the first substrate and the second substrate together to form the flow path member; and a plurality of recessed portions formed in at least one of the first surface of the first substrate and the second surface of the second substrate, wherein each of the plurality of recessed portions is configured to take up excess bonding adhesive and, when a shape of each recessed portion is viewed from the direction orthogonal to the first surface, the shape is approximately isotropic and the plurality of recessed portions includes recessed portions having different sizes, and wherein, when the shape of each recessed portion is viewed from the direction orthogonal to the first surface, a ratio between a short side A of the shape and a long side B of the shape is 1:1≤A:B≤1:2, where A denotes a short side of a smallest quadrangle in contact with an outer edge of each recessed portion and B denotes a long side of the smallest quadrangle in contact with the outer edge of each of the plurality of recessed portions.

16. A liquid discharge head comprising:

a discharge opening from which a liquid is to be discharged; and a flow path member having a flow path through which a liquid is supplied to the discharge opening, wherein the flow path member includes:

a first substrate having a first surface formed with an opening of a flow path in the first surface, a second substrate having a second surface facing the first surface, bonding adhesive provided between the first surface and the second surface to bond the first substrate and the second substrate together to form the flow path member, and a plurality of recessed portions formed in at least one of the first surface of the first substrate and the second surface of the second substrate, wherein each of the plurality of recessed portions is a hole configured to take up excess bonding adhesive and, as a non-through hole, does not extend through the entire thickness of a substrate, and wherein each of the plurality of recessed portions extends into the first substrate or the second substrate as a rectangular column or an elliptical column and, when a shape of each recessed portion is viewed from the direction orthogonal to the first surface, the shape is approximately isotropic, and wherein, when the shape of each recessed portion is viewed from the direction orthogonal to the first surface, a ratio between a short side A of the shape and a long side B of the shape is 1:1≤A:B≤1:2, where A denotes a short side of a smallest quadrangle in contact with an outer edge of each recessed portion and B denotes a long side of the smallest quadrangle in contact with the outer edge of each of the plurality of recessed portions.

* * * * *